(12) United States Patent
Williams et al.

(10) Patent No.: US 9,390,398 B2
(45) Date of Patent: *Jul. 12, 2016

(54) CREATING A COLLABORATIVE WORK OVER A NETWORK

(75) Inventors: David B. Williams, New York, NY (US); Craig Singer, Fair Haven, NJ (US); Christopher Williams, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 1937 days.

This patent is subject to a terminal disclaimer.

(21) Appl. No.: 12/584,411

(22) Filed: Sep. 3, 2009

(65) Prior Publication Data

US 2010/0070580 A1 Mar. 18, 2010

Related U.S. Application Data

(63) Continuation of application No. 10/238,333, filed on Sep. 10, 2002, now Pat. No. 7,603,626.

(60) Provisional application No. 60/317,997, filed on Sep. 10, 2001.

(51) Int. Cl.
  *G06F 3/0484* (2013.01)
  *G06F 3/0481* (2013.01)
  *G06F 17/22* (2006.01)
  *G06Q 10/10* (2012.01)
  *G07C 13/00* (2006.01)
  *H04L 29/06* (2006.01)
  *G06F 17/30* (2006.01)

(52) U.S. Cl.
CPC .............. *G06Q 10/10* (2013.01); *G07C 13/00* (2013.01); *G06F 17/3089* (2013.01); *H04L 65/403* (2013.01)

(58) Field of Classification Search
CPC ... H04L 65/403; H04L 51/16; G06F 17/3089; G06F 17/2288; G06F 17/24
See application file for complete search history.

(56) References Cited

U.S. PATENT DOCUMENTS

| | | |
|---|---|---|
| 5,671,428 A | 9/1997 | Muranaga |
| 5,819,032 A | 10/1998 | De Vries |
| 5,950,217 A | 9/1999 | Heinlein |
| 5,995,951 A | 11/1999 | Ferguson |
| 6,055,551 A | 4/2000 | Heinlein |
| 6,088,702 A | 7/2000 | Plantz |

(Continued)

OTHER PUBLICATIONS

Maddison et al., Peer Review, 1998, pp. 1-3.

(Continued)

*Primary Examiner* — Tadeese Hailu
(74) *Attorney, Agent, or Firm* — Farjami & Farjami LLP

(57) ABSTRACT

A system and method for having a plurality of participants author and submit segment candidates to create a collaborative work over a computer network. The plurality of participants receive segment instructions for authoring the segment candidates. The candidates are submitted to the system and at least a subset of the submitted segment candidates are distributed to a voting audience over the computer network. In response the system receives votes for a favored segment candidate from the voting audience. Next, a winning segment candidate is selected from the submitted segment candidates for inclusion in the collaborative work based on the votes. This process is repeated by the system until the collaborative work is complete.

20 Claims, 15 Drawing Sheets

(56) References Cited

U.S. PATENT DOCUMENTS

| | | | |
|---|---|---|---|
| 6,094,675 | A | 7/2000 | Sunaga |
| 6,304,861 | B1 | 10/2001 | Ferguson |
| 6,314,426 | B1 | 11/2001 | Martin |
| 6,473,784 | B2 | 10/2002 | Haneda |
| 6,601,087 | B1 | 7/2003 | Zhu |
| 6,611,822 | B1 * | 8/2003 | Beams et al. ............... 706/11 |
| 6,654,032 | B1 | 11/2003 | Zhu |
| 6,721,782 | B1 | 4/2004 | Fariborz |
| 7,082,430 | B1 * | 7/2006 | Danielsen et al. |
| 7,143,357 | B1 * | 11/2006 | Snibbe et al. ............... 715/751 |
| 7,810,037 | B1 * | 10/2010 | Edwards et al. ............ 715/749 |
| 2001/0025296 | A1 * | 9/2001 | Narang ...................... 709/201 |
| 2001/0027455 | A1 | 10/2001 | Abulleil |
| 2002/0065912 | A1 * | 5/2002 | Catchpole et al. ........... 709/224 |
| 2002/0075303 | A1 * | 6/2002 | Thompson et al. .......... 345/751 |
| 2003/0005068 | A1 * | 1/2003 | Nickel et al. ................ 709/208 |

OTHER PUBLICATIONS

Pope et al., Conservation Ecology, "Using the web for peer review and publication of scientific journals", Sep. 1998, pp. 1-10.

Matthews et al. Fifth International World Wide Web Conference, "Electronic management of the peer review process", May 1996, pp. 1-21, available on the Internet at http://www.ramb.ethz.ch/CDstore/www5/www117/overview.htm.

Donath et al., "Tele-Direction: A new framework for collaborative telepresence", The Tele-Actors Guild, UC Berkeley and MIT Media Laboratory (2001), available on the Internet at http://smg.media.mit.edu/papers/TeleDirection/Tele-presenceCHI2001.PDF.

Donath et al., "Collaborative tele-directing", MIT Media Laboratory and UC Berkeley (2001).

Chambers et al. "A java tool for collaborative editing over the internet", Department of Computer Science University of Houston, In Proceedings of the 1998, pp. 1-7, available on the Internet at http://citeseer.ist.psu.edu/chambers98java.html.

Jorda et al., A system for collaborative music composition over the Web, DEXA Workshop 2001: 537-542, available on the Internet at http://www.iua.upf.es/~sergi/articles/FMOLDexa.pdf.

David Munger, "The future of the internet as a collaborative environment: utopia or dystopia?", University of North Carolina, Mar. 2003, pp. 1-7.

Shen et al. "Recipe: a prototype for internet-based real time collaborative programming", School of Computing and Information Technology, Griffith university, pp. 1-6 (2000), available on the Internet at http://www.cit.gu.edu.au/~hfshen/papers/Shen_iwces2.pdf.

Lacoste et al., "European commission funds development of co-operative workplaces over the Internet: The UNITE consortium launches international project", Press Release, Mar. 2001, pp. 1-2.

Mathews, G J et al., "Electronic management of the peer review process", Computer Networks and ISDN Systems, vol. 28, No. 7-11, May 1996, pp. 1523-1538.

* cited by examiner

PARTICIPANT REGISTRATION FORM

| TITLE | FIRST NAME | MI | LAST NAME |

NICKNAME          EMAIL ADDRESS

PASSWORD          TYPE: (CHECK ALL THAT APPLY)

GENDER: (CHECK ONE)    ☐ MODERATOR
☐ MALE                 ☐ VOTER
☐ FEMAIL               ☐ SUBMITTER

BIOGRAPHICAL INFO

COMMENTS

FIG. 3

CREATING A COLLABORATIVE WORK OVER A NETWORK

RELATED APPLICATIONS

This application is a continuation of U.S. patent application Ser. No. 10/238,333, filed Sep. 10, 2002, now U.S. Pat. No. 7,603,626 which claims priority from previously filed U.S. Provisional Patent Application No. 60/317,997 filed on Sep. 10, 2001, which are incorporated by reference in their entirety.

FIELD OF THE INVENTION

The present invention generally relates to a method for the collaborative creation of a work, and more particularly, to a method for creating a collaborative work one segment at a time by putting a multitude of segment candidates contributed by a multitude of segment creators to an automatically tabulated vote over a digital network in a series of rounds in which a single segment is selected per round for inclusion in the collaborative work until the work is completed.

BACKGROUND OF THE INVENTION

With the rise in access to personal computers and computer networks, collaborative projects in which groups of individuals participate in the creation and/or modification of projects over a digital network have become increasingly popular. Currently, the vast majority of these activities occur in the corporate environment where both large and small teams of individuals collaborate on myriad business documents as well as graphic presentations, spreadsheets and the like. Corporate participants can collaborate by contributing or modifying content or commenting on existing or newly contributed content. It is typically left to the discretion of appointed members of the workgroup to determine which contributions and comments are finally accepted. This system can be highly efficient in small workgroups, but as the size of the group grows, it becomes evident that a system is needed in which the group can self-select the best content via the application of democratic principles in an automated system.

Other network-based systems are known that enable a group of participants to enter a "virtual meeting space" where real-time voice and video communication may take place and multi-media interactive presentations made. Some of these systems feature voting mechanisms where the meeting participants can be instantaneously polled and the results immediately known. However, these systems contain no facilities for utilizing the voting features in the automatic creation of a document one segment at a time.

Still other systems accessible through the world wide web are known, which employ democratic principles in the selection of content segments. Their primary use involves the ranking of comments posted to a network message board, so that the popularity of a particular comment, and/or the individual posting that comment, based on the frequency with which it has been accessed by others, will determine its ranking and position in a list of comments. While this method is extremely useful in prioritizing a vast web of discussion threads, its design does not accommodate the segment-by-segment creation of a structured document in which the sequence of each piece is vital to the coherence of the whole.

Collaborative story-telling is an activity as old as human kind. In a typical scenario, a group of individuals sit in a circle and someone starts off a story with a sentence, e.g. "On a dark and stormy night . . . " The story then proceeds from person to person around the circle with each participant contributing a new sentence or section to the story.

A current obstacle to collaborative story-telling is one of scale. As the number of participants increases, it becomes more difficult to administer a fair election with onerous review procedures and long lag times. Simply put, the activity becomes unproductive.

No current mechanism or system exists for multiple participants to collaborate in the creation of new works on a large scale. All they can do is electronically publish their creative work, then wait for haphazard comments from their peers. This vastly decreases the productivity of any collaboration that might occur. Additionally, it sets a high barrier for participating since it is necessary to publish an entire work (e.g., story or episode).

For example, in the movie industry, the high barrier of having to complete an entire screenplay alienates the vast majority of the public that does not have the time or training to author an entire screenplay. Moreover, the screenplays that are selected to be produced into actual films are inevitably chosen by an elite minority. This minority is too often swayed by the track record of the screenplay author and who the author knows in the business. This makes it exceedingly difficult for unknown screenwriting talent, or writing talent in any creative field, including literature and television, to be discovered.

The need for a collaborative environment that is easy to use and scaleable exists in other areas. For example, in educational environments, teachers and professors of creative writing often seek activities through which a group of students can learn through collaboration. Utilizing the internet, educators teach classes that may contain thousands of students. In these environments, developing activities which yield productive collaboration and effective learning through the interaction of the students is a growing challenge.

To confront these varied challenges, a new method and a system for collaboratively creating documents are needed which enable a group of participants to each contribute a small portion of a collaborative work, one segment at a time. In the case of a collaborative story or screenplay, individuals could contribute by writing just a few pages or less rather than the entire screenplay or story.

A method and a system are also needed to collectively elect by means of a voting process the individual segments that comprise the collaborative work. The contributor of each elected segment should have the opportunity to be recognized and commended by the group.

A further need exists for a system that allows an unlimited number of participants to vote and contribute from a wide-array of devices capable of accessing a network including, personal computers and PDAs.

A still further need exists for a system that accommodates a broad range of media formats, including text, images, audio, and video. Such a system should include software and hardware that automate routine functions to minimize administration requirements.

SUMMARY OF THE INVENTION

Generally speaking, the present invention is directed to a method and a system for creating a collaborative work by selecting one segment at a time from a multitude of segment candidates submitted by a multitude of segment creators by means of an automatically tabulated vote of a multitude of participants over a digital network.

The present invention provides a system that taps into the "collective genius" of a large group of individuals to select the best possible segments for inclusion in the final collaborative work, leveraging the judgement and creativity of each individual. The resulting collaborative work will have required minimal effort on the part of any single individual yet they will far exceed in scope and quality what would have been possible with a comparable individual effort, or the comparable collective effort of a group of individuals un-aided by the system.

In one aspect of the present invention, a computer-assisted method is provided for having a plurality of participants author and submit segment candidates to create a collaborative work over a computer network including the steps of providing segment instructions to the plurality of participants for authoring the segment candidates, receiving segment candidates prepared by at least some of the plurality of participants based on the segment instructions, distributing at least a subset of the submitted segment candidates to a voting audience over the computer network, receiving from the voting audience votes for a favored segment candidate, selecting a winning segment candidate from the submitted segment candidates for inclusion in the collaborative work based on the votes, and repeating the steps of submitting segment candidates and voting on the submitted segment candidates, and selecting a winning segment candidate to complete the collaborative work.

In another aspect of the present invention, the segment instructions for the collaborative document are provided to the plurality of participants during intervals, wherein each interval has associated therewith a segment instruction and segment candidates are submitted based on the segment instruction wherein segment candidates and votes can be received during the same time period.

In another aspect of the present invention, the votes are received from the audience in a round wherein a round comprises a time period for receiving segment candidates and a time period for voting on the submitted segment candidates.

In another aspect of the present invention, the votes are received in multiple voting stages, wherein each voting stage is used to select fewer submitted segment candidates for subsequent voting stages until a winning segment candidate is selected.

In still another aspect of the present invention, the participants prepare and submit a promo with each submitted segment candidate, wherein the promo includes a summary of the submitted segment candidate.

In yet another aspect of the present invention, a system is provided for creating collaborative works over a computer network, comprising a host server coupled to the computer network to distribute segment instructions and receive from a plurality of participants segment candidates based on the segment instructions, a voting module associated with the host server for presenting submitted segments to a voting audience over the computer network and for tabulating votes received from the voting audience for selecting a winning segment to be used in the creation of the collaborative work.

Accordingly it is an object of the present invention to provide a method and system for the creation of a collaborative work by receiving segments of the collaborative work submitted by multiple participants until the collaborative work is completed.

It is another object of the present invention to provide participants with tools for authoring and uploading segments.

It is another object of the present invention to provide a method and a system for voting on submitted segments and automatically tabulating voting results to select the segments to be used in the creation of the collaborative work (i.e., the winning segments).

It is another object of the present invention to provide such a system and method wherein segments are submitted together with promos, which include a summary of the submitted segment, and wherein the presentation and viewing of promos are tabulated as a factor in the voting results to select the winning segments.

It is another object of the present invention to provide a system and method wherein some segment candidates are eliminated prior to others based on a running tabulation in the course of voting. In turn, enabling more voting to occur with candidates that perform strongly, and less voting with candidates that perform weakly.

It is another object of the present invention to provide a multi-stage method for voting in order to narrow down the number of submitted segments.

It is still another object of the present invention to enable the multiple participants to collaborate over a global computer network using any number of computer devices connectable to the network.

Still other objects and advantages of the present invention will in part be apparent from the specification.

The present invention accordingly comprises the various steps and the relation of one or more of such steps with respect to each of the others, and the product which embodies features of construction, combinations of elements, and arrangement of parts which are adapted to effect such steps, all as exemplified in the following detailed disclosure.

BRIEF DESCRIPTION OF THE DRAWINGS

For a fuller understanding of the invention, reference is made to the following description, taken in connection with the accompanying drawings, in which:

FIG. 3 illustrates a sample registration interface;

DESCRIPTION OF THE PREFERRED EMBODIMENT

The present invention provides a method and system that enable an unlimited number of participants to create a collaborative work (e.g., document) over a computer network by submitting segment candidates, then selecting winning segments from the segment candidates by a vote of the participants. The process of submitting segment candidates, voting on segment candidates and selecting a winning segment repeats until the collaborative work is completed.

In a preferred embodiment, thousands of participants collaborate over the Internet to create, for example, a movie screenplay which, in addition to text, may be enhanced through the integration of audio and video elements. Participants may submit segment candidates that are voted upon in creating the final collaborative work or merely vote upon submitted segment candidates.

It is irrelevant whether the work being created is a text-only novel or a graphics-intensive corporate sales presentation. The method described is applicable to any work which can be divided into discrete units (e.g. pages, chapters, frames, sections, etc.) that are arranged sequentially and can be presented electronically (e.g., digitally). Additionally, it is irrelevant whether the number of participants is twenty or twenty-thousand; whether the collaboration occurs via personal computers over the Internet, or via wireless PDAs over a small corporate network; the collaboration may occur through a traditional client-server network architecture, or a peer-to-peer network in which project components are distributed over the computers of the participants.

As used throughout this specification, the term network, computer network or digital network is intended to encompass a collection of two or more computers in electronic communication via common protocols. Examples of digital networks include the Internet, Intranets, Extranets, Wireless Networks, Local Area Networks, and Wide Area Networks. The term computer refers to any electronic device comprised of one or more CPUs, static storage, dynamic memory, an input device and a display or similar output device. Examples include PCs, Videogames Consoles, PDAs, Palm Pilots, Pocket PCs, Cell Phones, Workstations, and Mainframes. The term work is meant to encompass a structure in which segments are presented containing any combination of media formats. Examples of works include stories, novels, screenplays, multi-media presentations, movies, and musical scores.

Figure 13:
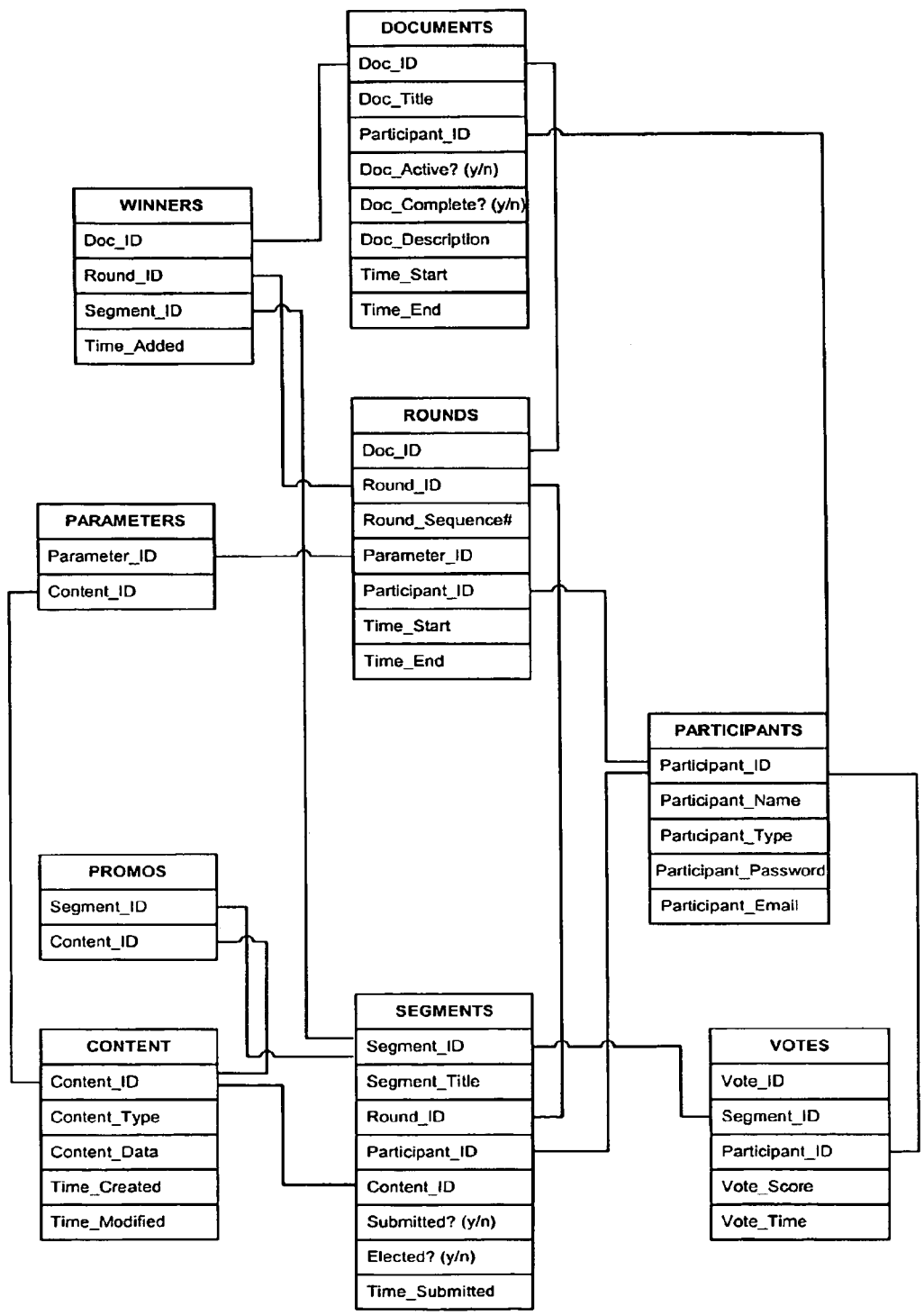
FIG. 13 illustrates an exemplary database architecture according to the present invention.

In a preferred system design, the application is implemented on a Microsoft or Unix platform. The underlying database might be a Microsoft SQL server, Oracle, or DB2. Depending on the number of participants and the size of the collaborative works, separate databases may be used to store participants' profile data, participants' submissions, and voter data. A sample database structure according to the present invention is illustrated in FIG. 13. The system of the present invention, which includes a participant accessible web site, is preferably implemented with compiled ActiveX, COM+ enabled, components using Microsoft Visual Basic 6.0. Business logic is incorporated into these components. These components will make the system significantly easier to maintain as the number of participants grows. Also, the components will make the system significantly more scalable. Preferably, Microsoft ASP 3.0 will be used to connect the components with a web site. The components can use Microsoft ADO 2.6 to connect with a database. Alternatively, the system implementation and development may be bolstered with C# and VB.NET.

Multiple scenarios are possible for implementing a system according to the present invention. For example, the web site can be hosted on a "shared" server, or the web site and related applications can reside on a dedicated single server. Alternatively, a major ISP can host the web site on a dedicated server(s) owned by the ISP or a third party service provider.

Figure 1:
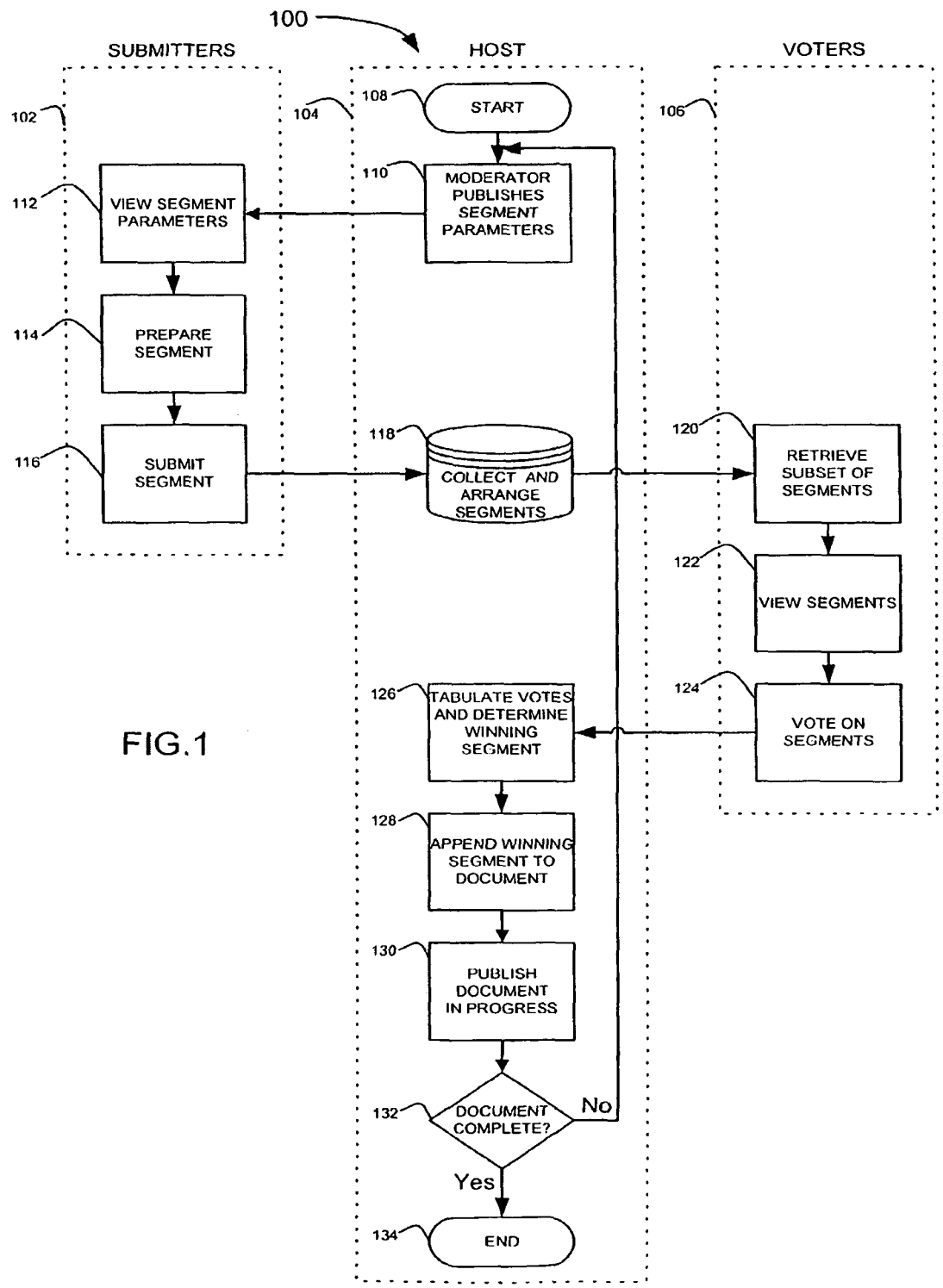
FIG. 1 generally illustrates, in flow diagram form, a method and system for creating a collaborative work according to the present invention.
Figure 2:
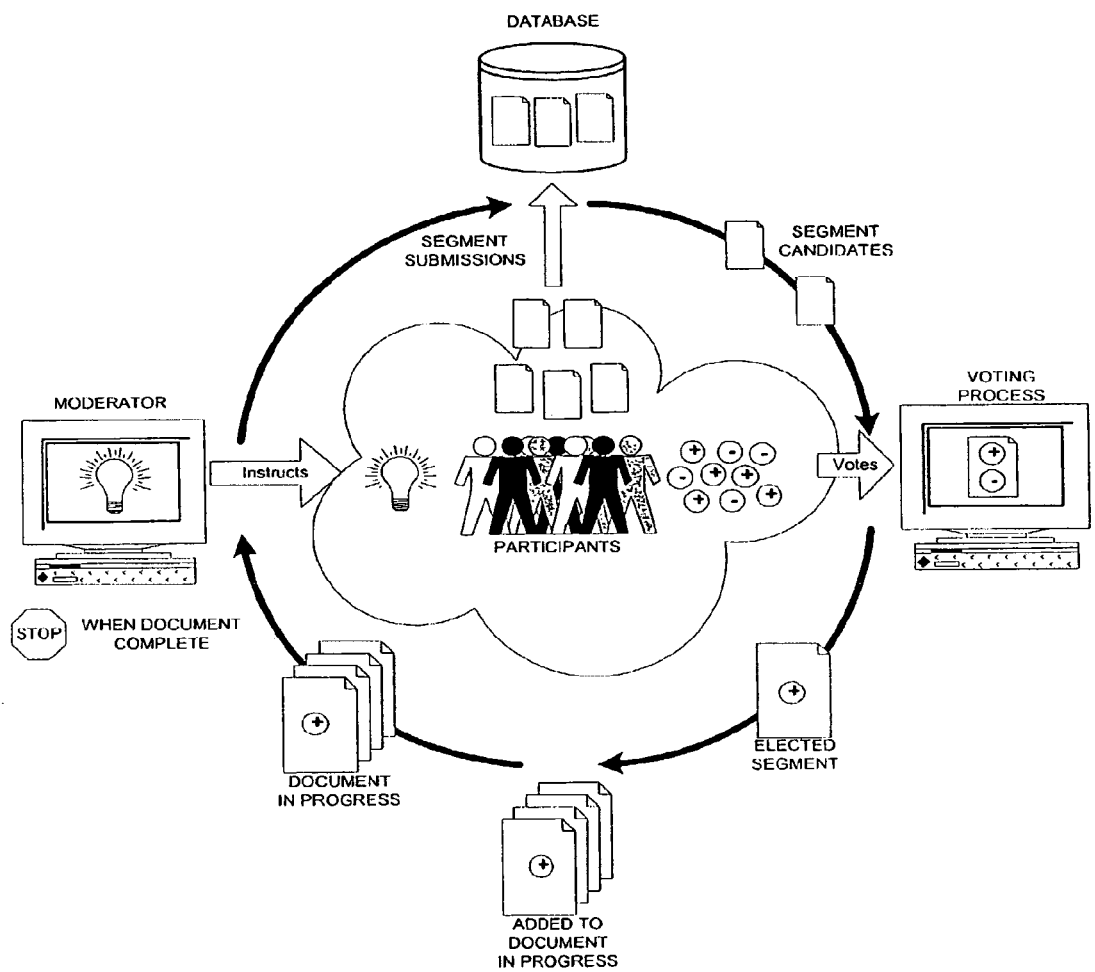
FIG. 2 illustrates diagrammatically the process cycle according to FIG. 1.

Referring to FIG. 1, a method and system (generally shown as 100) according to a preferred embodiment of the present invention are illustrated. The process is also diagrammatically shown in FIG. 2. Generally speaking, the method includes two main processes, the submission process and the election process. The submission process determines how participants send in new segments and the election process determines which submitted segment is included in the final collaborative work. As will be explained in greater detail, the final collaborative work is created using a series of measured intervals (or divisions of time), known as rounds. Each round involves both the submission and election processes. A round ends when a single segment wins an election and becomes part of the collaborative work in progress.

In a preferred method according to the present invention, a moderator is designated to publish, in a series of rounds, over a computer network a set of segment instructions or parameters for the segment of the collaborative work to be created. The purpose of these parameters is to provide instruction and specification to the submitters, and then voters, for the segment to be submitted. The parameters may be extensive or brief, or non-existent, if, for instance, a viewing of the previously selected segments will provide sufficient instruction for the creation and selection of the next. Once the segment instructions are published, a round is initiated.

In an alternative embodiment, the collaborative process is initiated with the "kick-off round," the first round. The kick-off round is identical to a regular segment round, except that instead of submitting and voting on a segment, participants will submit and vote on a document "premise." The process to submit a premise is identical to the process used to submit a segment. The process to elect a winning premise is identical to the process used to elect a winning segment. The winning premise will direct the creation of the remaining document. Once the kick-off round is complete and a single premise has been elected, the elected premise is used as an internal guide for moderating the future rounds. Once the general document outline has been created, the moderator will issue instructions for the next round—a standard segment round.

All segment candidates submitted during a single round have a common theme or story line as established by the moderator in the segment instructions. A segment is typically associated with only one collaborative work. Each segment contains at least a title, author and body. The segments are stored in the system database and recalled in a fashion which enables all networked participants to vote for the best segment candidate using a range of voting methodologies, some of which will be explained in more detail hereinafter.

Referring again to FIG. 1, in the preferred embodiment, the participants utilize personal computers to communicate over the Internet with a host 104. However, the present invention is not limited to an Internet environment. Participants may engage in submitting segment candidates in the role of submitters 102 or voting on segment candidates in the role of voters 106. A participant may be both a submitter 102 and a voter 106. However, preferably a participant may not vote on his or her own submission. One participant is assigned the role of the moderator. The moderator may interface with the host 104 via remote computer over the network, or via a local means associated with the host 104. As previously explained, the moderator initiates the collaboration by providing the instructions (the parameters) at step 110, thereby triggering the submission and election processes for all segment candidates submitted during the round.

Preferably, before a participant can participate as a submitter 102 and/or voter 106, he or she must login and register with the host 104. Referring to FIG. 3, a sample registration screen is illustrated. The participant supplies name, gender, biographical information and indicates his or her intended role(s). Obviously, other registration screen designs are possible without departing from the scope of the present invention.

With the round underway, the submitters 102 view the moderator provided instructions at step 112 and each prepare a segment candidate based thereon at step 114. The submitters upload the segment candidate to a database 118 associated with the host 104. A tool may be provided for uploading segments. The submitted segment candidates are collected and arranged in the database 118 into a segment pool.

A segment pool is a common collection of submitted segments that may be presented for viewing and voting to a participant. The term "common collection" refers to all the segments submitted in one round that were written in response to a common round segment instruction. Each round will have one segment pool. As long as a segment remains in the segment pool, then that segment may be presented to a system participant. The entire voting process as well as how documents are removed from the segment pool will be described below.

At step 120, the voters receive a subset of the submitted segment candidates. During each voting session the host 104 retrieves one or several subsets of all of the candidates from which the voter will choose to view and potentially vote on. In order to accommodate a large number of candidates, this component must retrieve the subset according to certain guidelines. The goal of these guidelines is to provide maximum fairness, giving each candidate a fair and equal chance to compete to be elected the winner; and, to prevent the subsets from containing too may weak candidates. For example, the subset generation may first tabulate, rank and filter the candidates to narrow the field to candidates whose promos have not yet received a minimum number of views ("promo views"). It may narrow the field further by eliminating candidates which have a low ratio of the number of promo views to the number of times the promo has been selected and the full segment viewed by the voter. This way, candidates which have not generated sufficient interest with their promo may be dropped from the segment pool. Additionally, the field may be further narrowed by eliminating candidates which have consistently received low ratings (e.g., rating between 1 and 10).

At steps 122-24; the voters view and vote on segments candidates. Votes are returned to the host 104 and tabulated at step 126 to determine a winning segment. The winning segment is appended to the collaborative work at step 128 and the work in progress is published at step 130. The process is repeated until the collaborative work is completed at which point the process ends.

The host 104 preferably includes an administrator module to monitor the submitting and voting process and modify certain activities. The system administration module allows easy access to the critical databases, enabling an administrator to view, edit, and delete entries as necessary. The main uses of an administration module are to prevent participants from subverting the voting process by using multiple participant registrations to load up votes for or against certain segment candidates (i.e. "stuff" the ballot box), prevent participants from submitting segment candidates which contain plagiarized material, and prevent participants from violating community standards of decency by submitting segment candidates containing material which my be deemed inappropriate or obscene by the community. Another use of the administration module is to modify the voting criteria in order to optimize the voting process.

Figure 4:
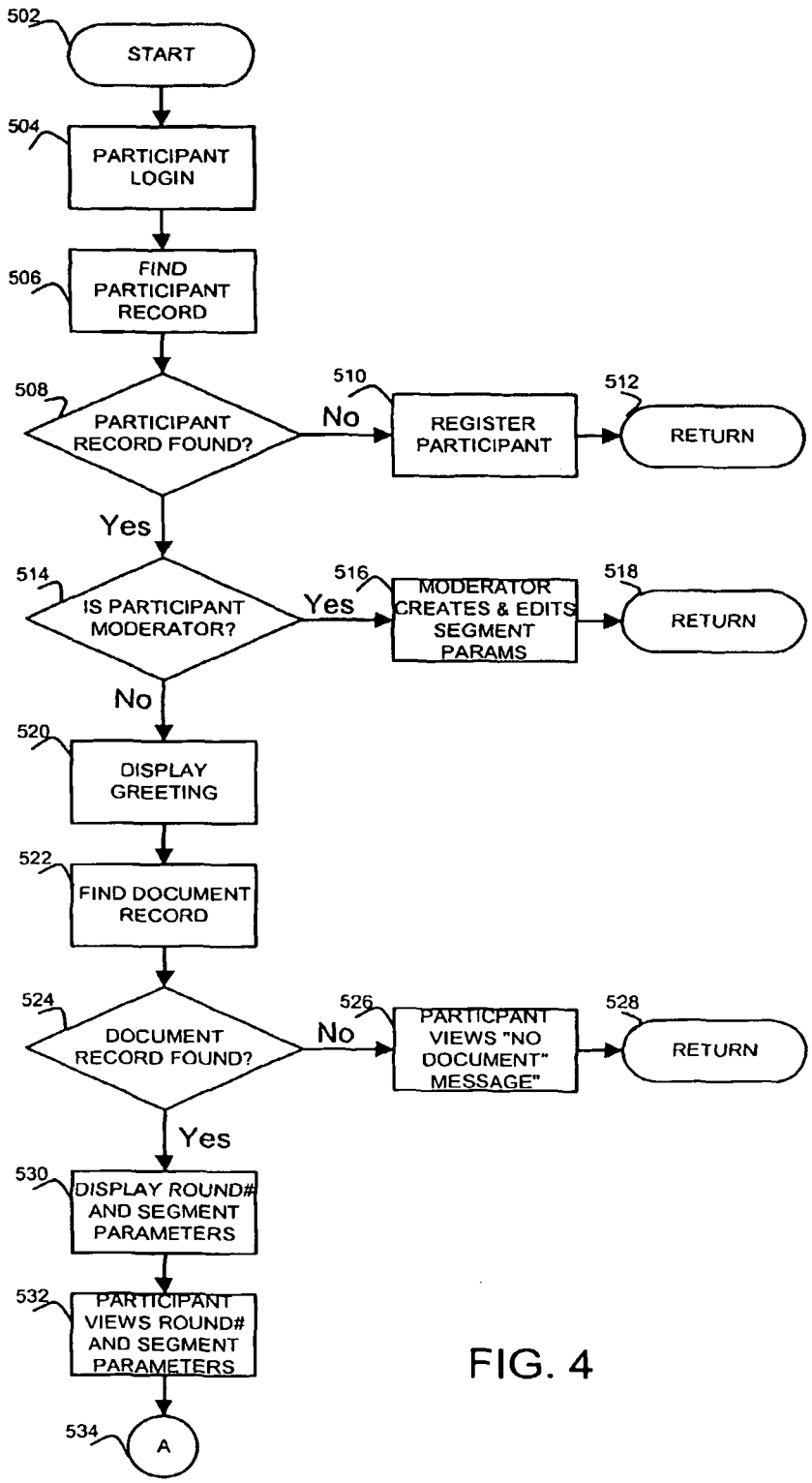
FIGS. 4 and 5 illustrate, in flow diagram form, the various processes in a method for creating a collaborative work according to the present invention.
Figure 5:
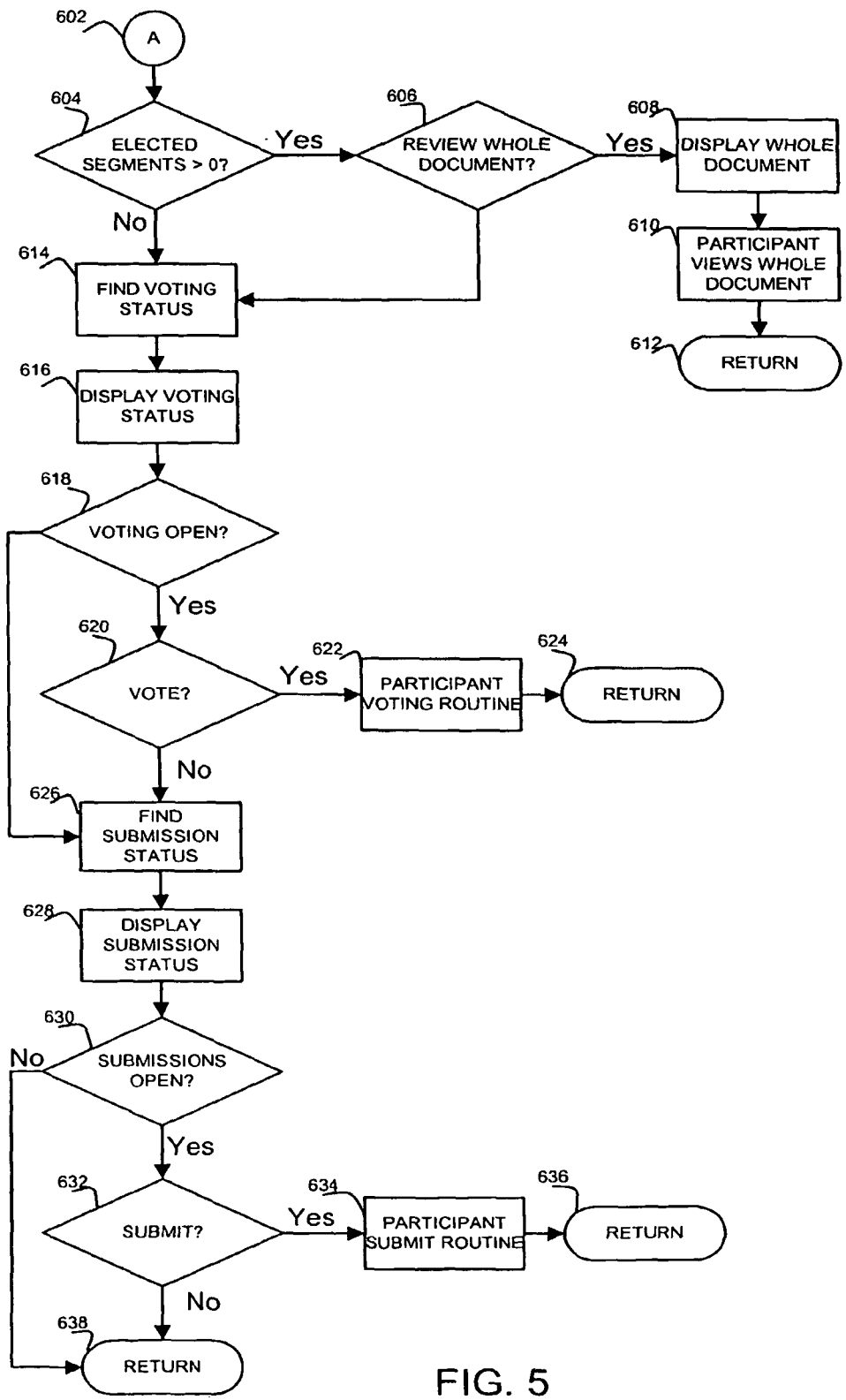

Referring to FIGS. 4 and 5, a more detailed flow of the method according to a preferred embodiment of the present invention is illustrated. Referring first to FIG. 4, assuming a participant has already registered with the system 100, the participant logs into the host 104 and identifies herself at step 504. The host 104 finds the corresponding record in the participant database at step 506 and determines whether the participant is in the role of the moderator at step 514. If a participant record is not located, a new record is created at step 510.

If the participant is identified as the moderator, the moderator is permitted to initiate a new document and input the segment instructions (parameters) at step 516. For example, segment parameters may summarize a love story and suggest that the participants begin by having the two romantic leads meet. When the moderator has completed the parameters, she submits them to the host where they are added to the parameters database and associated to the current round, in this case the first round. This begins round one in which segment candidates are collected and a single winning candidate will be elected to become the new document's first segment. Each round may include at least two voting stages. The voting stages are used to narrow the pool of segment candidates.

When the first registered participant logs in and is identified as someone other than the moderator at step 514, the host transmits over the network a greeting at step 520. If at step 524 a document is found, the following exemplary information will be displayed on the participant's computer at steps 530-32: the current round is "one"; the round one segment parameters are to write the first scene in a screenplay for a love story in which the two romantic leads meet; submissions are open; zero have been made; submissions will be accepted for round one for X remaining hours and minutes; voting is closed (there are too few submissions for a productive voting session); voting is estimated to open in X hours and minutes; and there is no document in progress to view since this is the first round and no segment candidates have yet been elected. In the preferred embodiment, the segment parameters may be broken-up into sections which are viewed individually to accommodate longer, more comprehensive, or structured parameters. Parameters may include other elements, such as video, audio and image elements.

Continuing with the description of the flow in FIG. 4, at step 532, the participant wishing to submit a segment candidate, reads the segment parameters provided by the moderator. Based on those parameters, a participant can then create a segment for submission. Whether a participant is permitted to submit a segment may be limited by certain predefined submission rules.

More particularly, referring to FIG. 5, at step 626, the host 104 finds the status of the submission process and transmits it over the network to the participant's computer where it is displayed at step 628. The host 104 also transmits information about how many submissions have been made, and how much time is left to submit for the current round. Once it is determined that submissions for the current round are being accepted at step 630, the participant is given the option of submitting a segment candidate at step 632.

Figure 6:
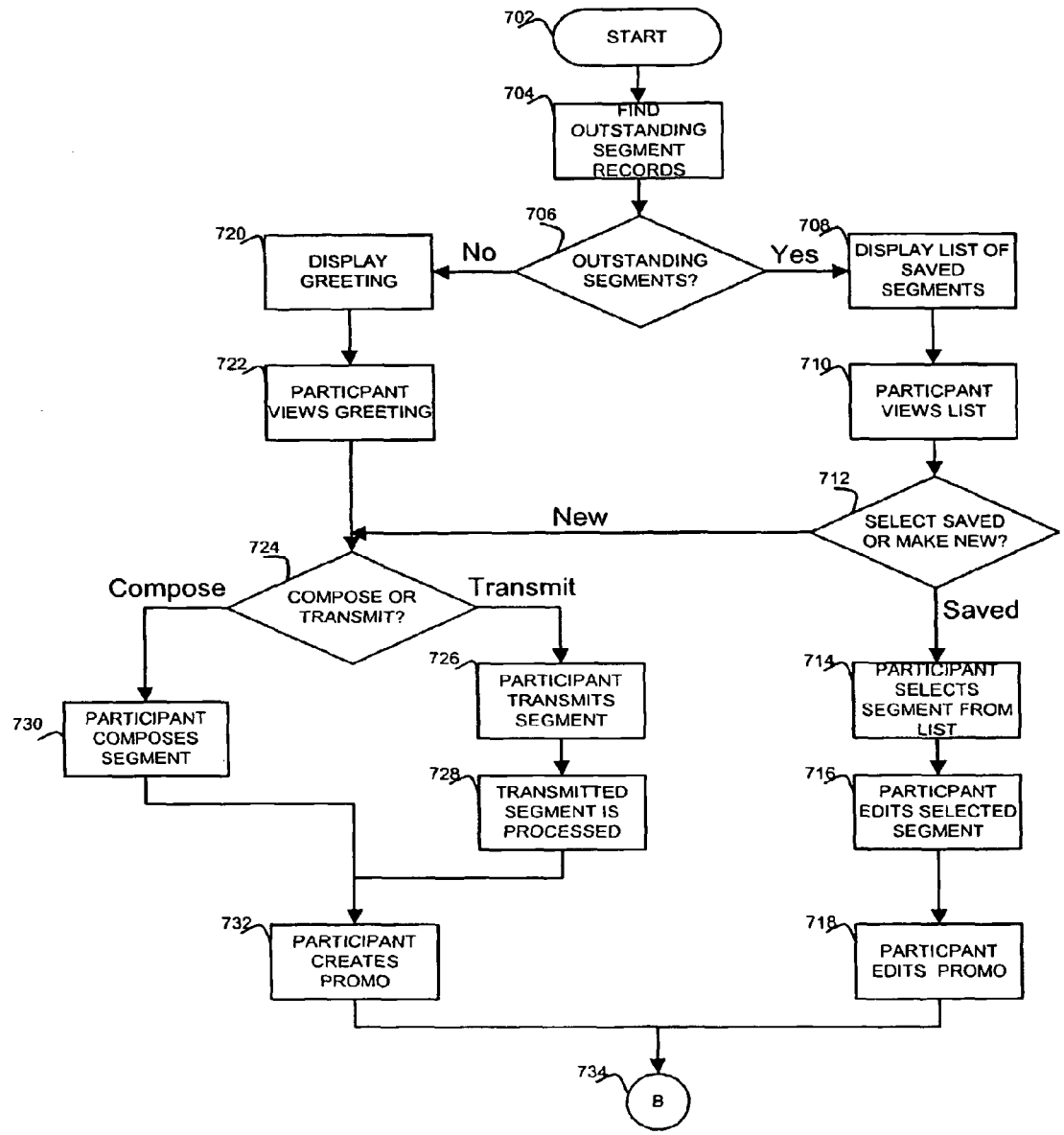
FIGS. 6 and 7 illustrate an exemplary segment candidate submission routine according to the present invention.

After the participant chooses the submit option at step 632, the host provides the participant with a submission preparation routine which allows the submitting participant to compose and edit the segment (or segments), then submit it immediately or save it in the segment database for submission at a later time. Referring to FIG. 6, and in particular steps 704-12, a participant may retrieve and edit stored segments, prior to submission (See FIG. 7).

Figure 8:
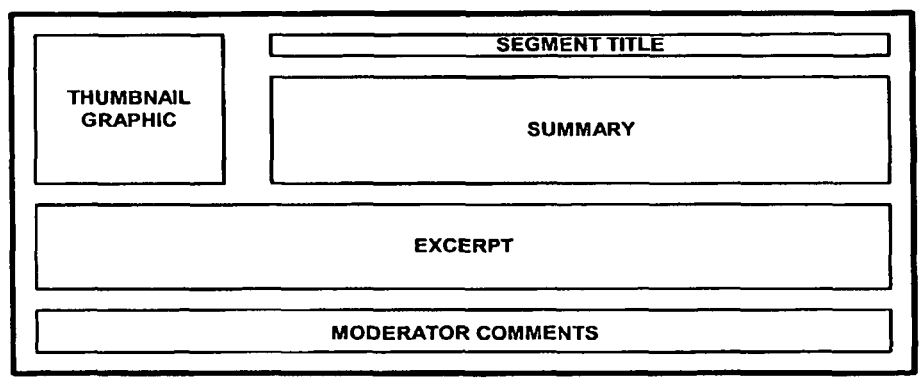
FIG. 8 is an exemplary promo according to the present invention.

Along with the segment itself, a submission also consists of a summary listing or promo. An exemplary promo is illustrated in FIG. 8. The promo is a brief summary of the submission and may include fields for a small "thumbnail" graphic, headline or title, summary, excerpt, and moderator comments, as shown in FIG. 8. Optionally, the promos may include comments from other participants. The promo serves the critical purpose of providing other participants a fast and convenient means of scanning many segments in a short amount of time in the same way that book covers in a bookstore allow hundreds to be evaluated before a person actually removes one from the shelf to peruse further.

Each segment must have an associated promo, and each promo must have an associated segment. In the preferred embodiment, the promo may be prepared in advance and stored for later submission along with the segments. As shown in FIG. 6, promos, like segments, may be retrieved and edited before submission. The small thumbnail graphic incorporated into the promo may originate from the submitting participant, or be selected from a library of potential thumbnail graphics (e.g., jpg or gif images) provided by the host. All other fields will be plain text and can be entered using online forms (e.g. HTML forms) or an upload tool (described hereinafter).

A participant may use one of two methods to submit a segment or promo to the host 104: (i) create a file on his or her local computer and upload it to the host application; and (ii) use an online authoring tool to create and submit a segment.

The host 104 allows the submitting participant to prepare his segment in a third-party application such as a commercial word processing or screenwriting package (e.g. Microsoft Word, WordPerfect, Final Draft), then transmit the completed file to the host 104 which processes the file into a standard segment format and saves it (or a reference to it) in the segments database 118. This means of transmitting files (or references to files) to the host 104 is also used to associate other media types such as graphics, audio or video, to a submission.

If the submission is a file upload, the file must be saved in an acceptable binary file format. The submitting participant must specify the type of binary file format at the time of upload. Acceptable formats include: text-only, with line breaks (.txt), Rich Text Format (.rtf), Microsoft Word, WordPerfect, Final Draft and Movie Magic. The system 100 can be provided with an upload tool to facilitate a segment upload. Preferably, a third party program such as ASP Upload, on a Microsoft Windows system, will be used to facilitate the actual file upload.

An online authoring tool in the form of a simple layout of HTML form elements will be included in the host web site so that a participant may create, edit, and submit a segment. Additional functionality of the online authoring tool allows a participant to preview the draft of his or her segment before it is submitted to the segment pool, to save a draft of a segment on the host before it is submitted, and to delete an un-submitted segment that he or she has authored using this tool (See FIGS. 6 and 7). Preferably, only authorized participants will have access to the host online tools. The host tools will also allow participants to create, edit, preview, and submit segment promo information to the system.

Figure 7:
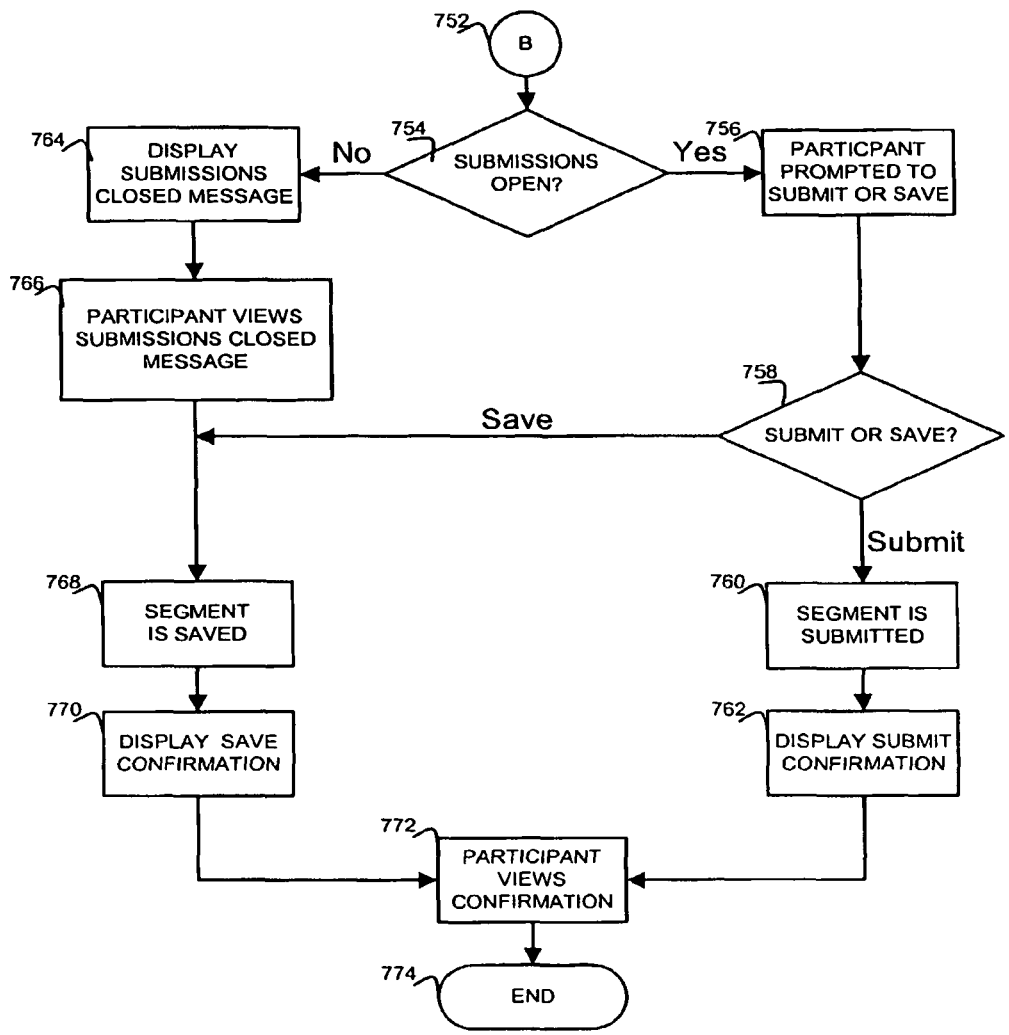

When the participant is satisfied with the segment and its promo, the participant transmits to the host 104 the instruction to submit the segment (and promo). As shown in FIG. 7, the segment is submitted at step 760 and a confirmation is returned to the participant at steps 762 and 772. If, over the course of preparing the segment, the submission process for the round has run out of time and closed, then the host 104 does not provide an option to submit, but in its place transmit a message announcing that submissions have been closed (See steps 764-66 in FIG. 7). The participant is allowed to save the submission. If the submission process is open, then the segment is recorded in the segments database 118 along with the time and the participant's identity. The promo is stored in the promos database.

In the current example, the submitting participant has submitted a scene in which the two romantic leads meet when their commuter bus runs out of gas. The promo describes the scene and includes an excerpt of dialog. Additionally, the promo may include the small thumbnail graphic of a bus.

It should be noted that when an uploaded file has been received or an on-line authored document is received by the system, a segment parser translates the file into the format selected by a host administrator for this round (e.g., the HTML format).

Once the parser has determined whether the submitted segment is in an acceptable format, the parser will ensure that submitted segments meet certain submission rules; for example, a minimum and a maximum segment body size, a minimum and a maximum promo size, a minimum and maximum promo headline size, a maximum thumbnail size, a minimum and a maximum promo excerpt size, maximum and minimum comment size, a maximum number of segments that each participant can submit per round, and a minimum number of ratings a participant must cast before he/she is allowed to submit a segment. If a submitted segment is not validated, an error message will be displayed to the participant.

After the segment has been parsed, validated, and translated into the proper HTML format, the submitted segment will be displayed in a preview screen before the participant makes the final submission. After reviewing the submission, the participant may make changes by uploading a new version of the segment using the site upload tool or by using an online form. The participant may finalize the segment submission by pressing a button (See FIG. 7). The submitted segment will be stored in the database 118. When a segment has been successfully uploaded and submitted, it will be effectively placed into the segment pool. The segment candidate is now eligible to receive votes and goes into a voting rotation.

The submitted segment may now be eligible for voting by a voting audience of participants. Returning once again to FIG. 5, the host 104 finds the status of the voting process and transmits it over the network to a participant's computer where it is displayed at step 616. Based on criteria established by the voting module, there may be time at the beginning of the round when there are too few submissions to make for a productive voting session. In addition, only a few segment candidates may be available to choose, making the voting more vulnerable to unfair manipulation. Desirably, the host 104 also transmits the time remaining to vote in the current round, or, in the case that voting is not yet underway, the time remaining until the voting process is opened.

Once it is determined at step 618 that the voting process for the current round is open, the participant is given the option to vote at step 620-622. In the preferred embodiment, an additional option may be provided to participants who wish to browse segment candidates as though voting, without actually being able to cast votes. This option is provided irrespective of whether voting or submitting is open or closed.

The host 104 determines, based on the criteria established by the voting system, that a sufficient number of segment candidates has been received to commence the voting process. The host transmits this information to be displayed on the computer of any participant who logs into the system: "Voting is open; there are X hours and minutes remaining to vote."

Figure 9:
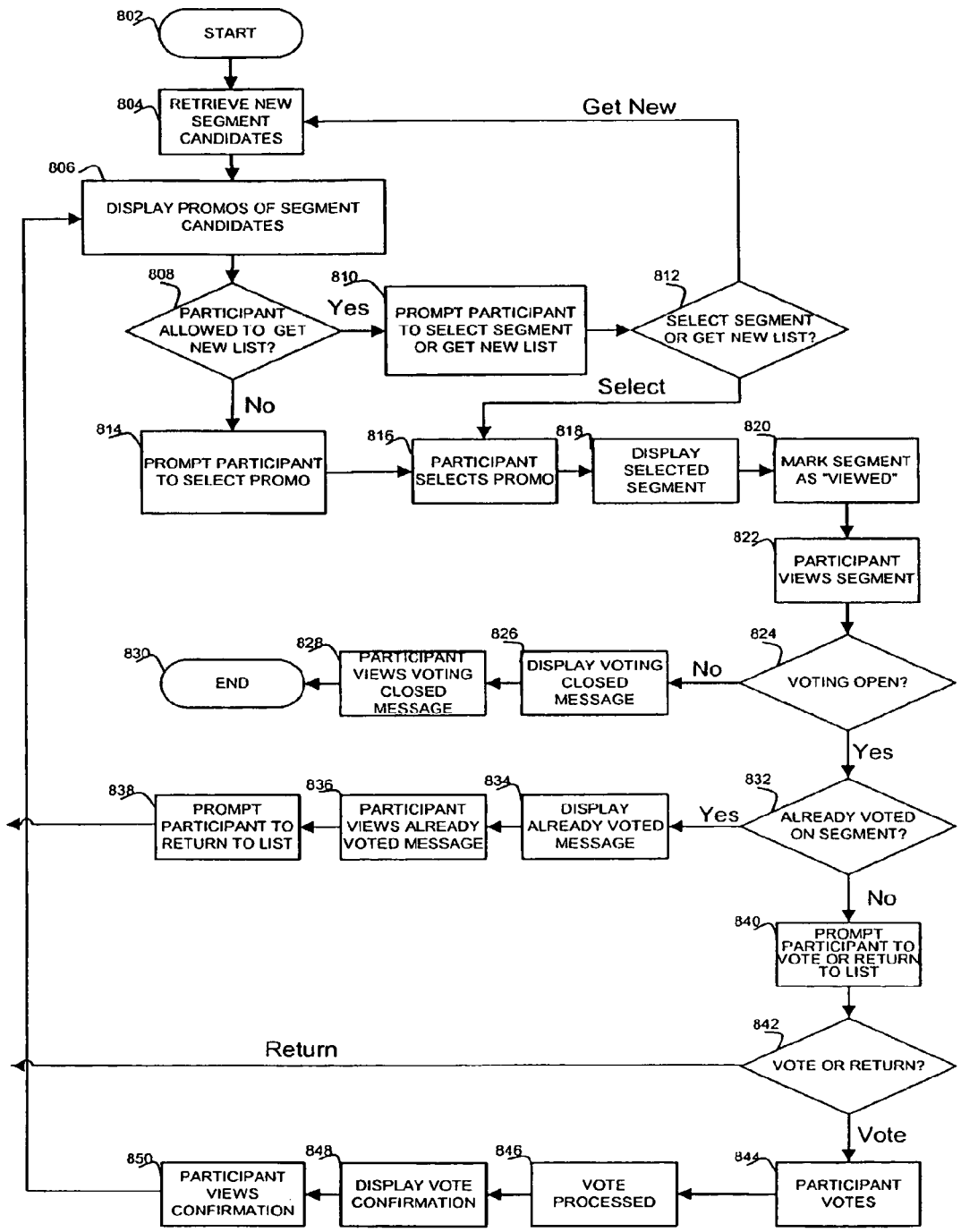
FIGS. 9-10 illustrate a two-stage voting routine according to the present invention.

The participant wishing to vote chooses the voting option at step 620. The host 104 then initiates the voting routine (See FIGS. 9-10) which may utilize the principles of Approval Voting, Majority Voting, Pairwise Voting, Borda Count, Weighted Polling, or other established or new voting methodologies. In the preferred embodiment, to reduce the occurrence of prejudicial voting, the identities of the segment submitters will remain anonymous to each voting participant throughout the voting routine. As a result, no voter will know who submitted the segment which is being voted on. To further reduce prejudicial voting in the preferred embodiment, the current ranking or voting results for a segment candidate will be hidden from the voting participants.

Figure 10:
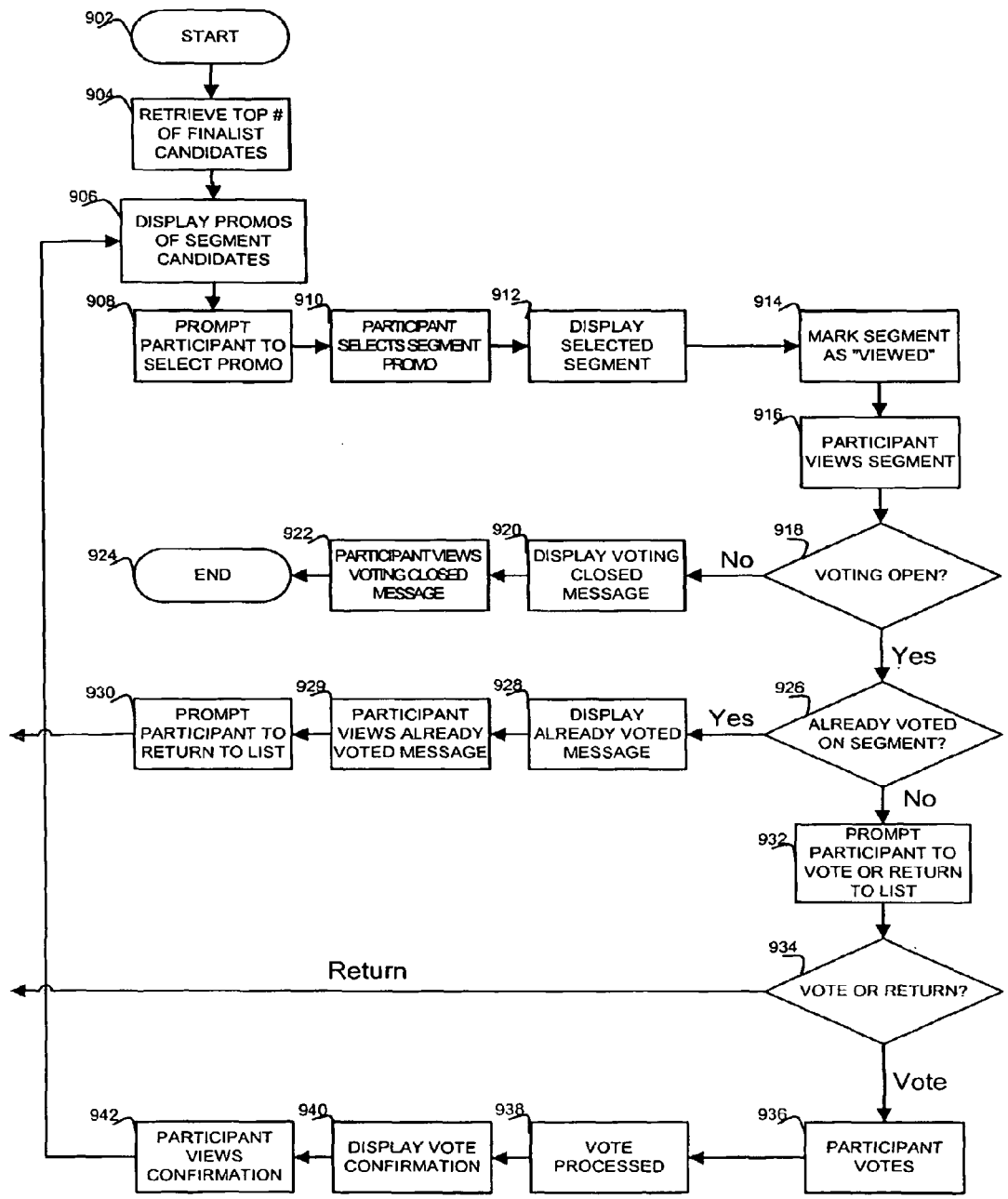

In a preferred embodiment, a two-stage voting system is employed in which the segment candidates are first narrowed to a small number of finalists (See steps 802-50 in FIG. 9) at which point the voting results for each finalist are reset and a second stage of voting commences (See steps 902-42 in FIG. 10). The two-stage process will help ensure that the voting participants are able to carefully consider the merits of only the strongest candidates before selecting a final winning candidate. Voting systems which utilize more than two stages of voting may also be utilized.

In general, multi-stage voting processes provide greater opportunity for participants, including the moderator, to influence the vote at various stages. Participants may discuss the merits of segment candidate finalists, and/or a moderator may comment on the preferred direction of a particular segment. In a single phased, mad dash to elect a winning candidate, there may not be enough opportunity to consider the nuances of the segments being considered. These nuances are best considered after the field of segment candidates has been somewhat narrowed.

Preferably, the first stage begins immediately after the moderator has issued round instructions and a minimum number of segment candidates have been submitted, and ends after a predetermined "end time." The first stage end time will be entered into the system by an administrator before the round starts. All times entered into the system, including stage duration times, can be in the form of hours and minutes. An administrator may extend or shorten the end time of the first stage after it has begun.

In the two-stage voting routine, a subset of the segment candidates (between one and fifteen) are retrieved from the segment database by the host. The retrieved subset is determined by criteria established by the voting system. Part of this criteria may be the number of times a given segment candidate has been previously retrieved. With the goal of giving each candidate a fair chance, segment candidates which have been retrieved a small number of times (or zero times) may receive preference (i.e. higher rotation) over segment candidates which have been retrieved many times. However, in the preferred embodiment, a segment candidate is not included in a retrieved subset if the voting participant is the same participant who submitted that segment candidate (i.e. participants may not vote for their own segment candidates). In addition, no segment candidate shall be included in the retrieved subset if that segment candidate has already been voted on by the current voting participant (i.e. no voting for the same candidate more than once). If there are only a small number (between two and fifteen) of segment candidates in total, then the entire segment pool may be included in the retrieved subset, so long as they do not violate any of the previously noted prohibitions.

Each time a participant views an appropriate web page, that participant "requests" to view a segment from a "segment presenter." The segment presenter is a system utility that presents segments to requesting participants. The segment presenter essentially takes a segment out of the segment pool and gives that segment to the requesting participant. From the perspective of the requesting participant, the segment presenter is a black box—the participant requests a segment and the participant receives a segment; how and why a segment is selected is not known to the requesting participant.

The presentation of segments will seem random. Participants will always view previously unseen segments unless a participant has already seen all submissions remaining in the segment pool. The segments viewed by the individual participants will be determined by the segment presenter. The participant will view the segment promo first. The participant will have the option of viewing the entire segment body or viewing a new promo.

With a subset of segment candidates retrieved by the host, the promo for each retrieved segment candidate is transmitted over the network by the host and displayed on the voting participant's computer. By displaying only the promos rather than the complete segment candidates, the voting participant is able to quickly scan the subset of segment candidates and then choose which segment candidates he will view fully. (In a Pairwise Voting system, the promos are preferably displayed in pairs.) From the displayed promos, the voting participant chooses one or several segment candidate(s) to view fully.

In the preferred embodiment, the voting participant may not request a new subset of segment candidates until he has viewed and/or voted on a minimum number of segment candidates. This limitation, established by the criteria of the voting system, will help to ensure that voting participants do not keep requesting new subsets in an attempt to locate a specific segment candidate and subvert the integrity of the vote; and to help ensure that the necessary amount of viewing and voting occurs to result in a fair vote.

The participant will view the segment comments when the participant is viewing in the segment promo. Once a participant has viewed a segment body that participant will have the option to rate and/or comment on the viewed segment. The segment presenter will have a control that will restrict a participant from viewing a segment that he or she submitted. This control can either be on or off.

Once a voting participant chooses a segment candidate from the displayed promos, the host transmits the full segment body to the voting participant's computer where it is displayed. If the segment is long or contains multiple media files, it may be transmitted and displayed in parts. In a Pairwise Voting system, two segment candidates will be transmitted and displayed.

The voting participant then views the full segment candidate or candidates then makes a determination about merit, good or bad, for each one. In a first embodiment, the voting participant transmits his vote on each segment candidate to the host. The means by which the voting participant's determination of merit is expressed varies depending on the particular voting methodology being employed. It may consist of a vote "for" or a vote "against" the segment, or both; it may be expressed through a rated scale (e.g. one to four stars, one through 10, etc.) or a series of categorized rated scales (e.g. dialog 1-10, style 1-10, and overall 1-10). In a Pairwise system, two (or more) segment candidates may be viewed and then ranked in relation to one another. The voting participant may also elect not to vote on a given segment candidate.

The host processes the vote, recording the current time and identity of the voting participant. The host keeps a running tabulation of votes for each segment, which may include the number of times a segment has been retrieved and fully viewed as well as voted on. All of these factors feedback to the criteria established in the voting system to determine not only which segment candidate is ultimately elected, but which segment candidates will be retrieved by the host in the subsets for subsequent voting participants.

For a time, the process of submitting segment candidates and voting on segment candidates will occur in parallel. At a particular point, to help ensure that all segment candidates have a fair chance, the host may close the submission process. This threshold will be determined in the criteria of the voting system by a combination of factors including the amount of time remaining in the voting process, the rate at which votes are being received, the rate at which new segment candidates are being submitted, and the spread of votes among the candidates. When the submission process is closed, the host transmits this information to be displayed on the computer of any participant who logs into the system: Submissions are closed; X number of submissions have been made for round one (See FIGS. 5 and 7).

The host will determine that the voting process is complete when certain criteria established by the voting system are satisfied. The criteria includes the amount of time spent voting, a minimum number of votes and/or views and/or retrievals has been received by each segment candidate, and the spread between the votes of the segment candidates is such that a clear winner (or winners) can be determined.

With a winning segment selected, the host records it as elected in the segments database and; appending it to the end of the document in progress, records it to the winners database, thus "growing" the document by one segment. Round one is now complete. When a registered participant logs in, the host will transmit status information to be displayed on the participant's computer: Round one is complete; Voting and submitting is closed. With a segment of the document determined, the host will now make available the option to view the document in progress, as shown in FIG. 5.

Returning to FIG. 5, at step 604, the host determines whether or not any segments have yet been elected for the current document; that is, does the document have any content that has been previously elected? If "yes", then the participant is given the option to view the document in progress in steps 606-10.

Round two will begin when the moderator inputs and submits the parameters for the next segment. The cycle of submitting and voting now begins again as registered participants log into the system to discover that a new round has begun. The rounds continue until the moderator tells the host 104 that the document is complete, at which point, the only option for participants is to view the document in progress.

In an alternative voting routine, each round consists of more than two stages. An example of an alternative multi-stage voting process is diagrammatically illustrated in FIGS. 11 and 12.

In the current embodiment, preferably, all votes are assigned a "vote rating" and attributes which include: (i) "is Browsed"; (ii) "is Viewed"; and (iii) "is Rated". The default value for all three attributes is false. The vote rating is entered by the voter and is based on a rating scale (e.g. 1 through 10 with single increments). Other rating scales and increments may be used. Only viewed segments can be rated.

A segment is recorded in the host 104 as "is Browsed" when a voter views a segment promo. The value is set to "true", and the vote is given a rating of 0. When a voter views a segment body, the value for the "is Viewed" attribute is set to "true" indicating that the segment has been viewed by a voter. When a voter rates a segment, the "is Rated" attribute is also set to "true" and the Vote Rating is the rating selected by the voter. Voters can also include a short comment with their votes.

To calculate a total vote score, the following exemplary formula may be used: [(Views*View Weight)+(Rating*Rating weight)]/(Browse*Browse Weight). The number of views and browses for a particular segment and voter provided ratings are weighted on a per-stage basis. The weights are preferably set by an administrator based on empirical voter-response data and may vary based on the stage. For example, one set of weights may be used to rank segment candidates in a final tally, while another is used to generate subsets of candidates in a voting session.

Figure 11:
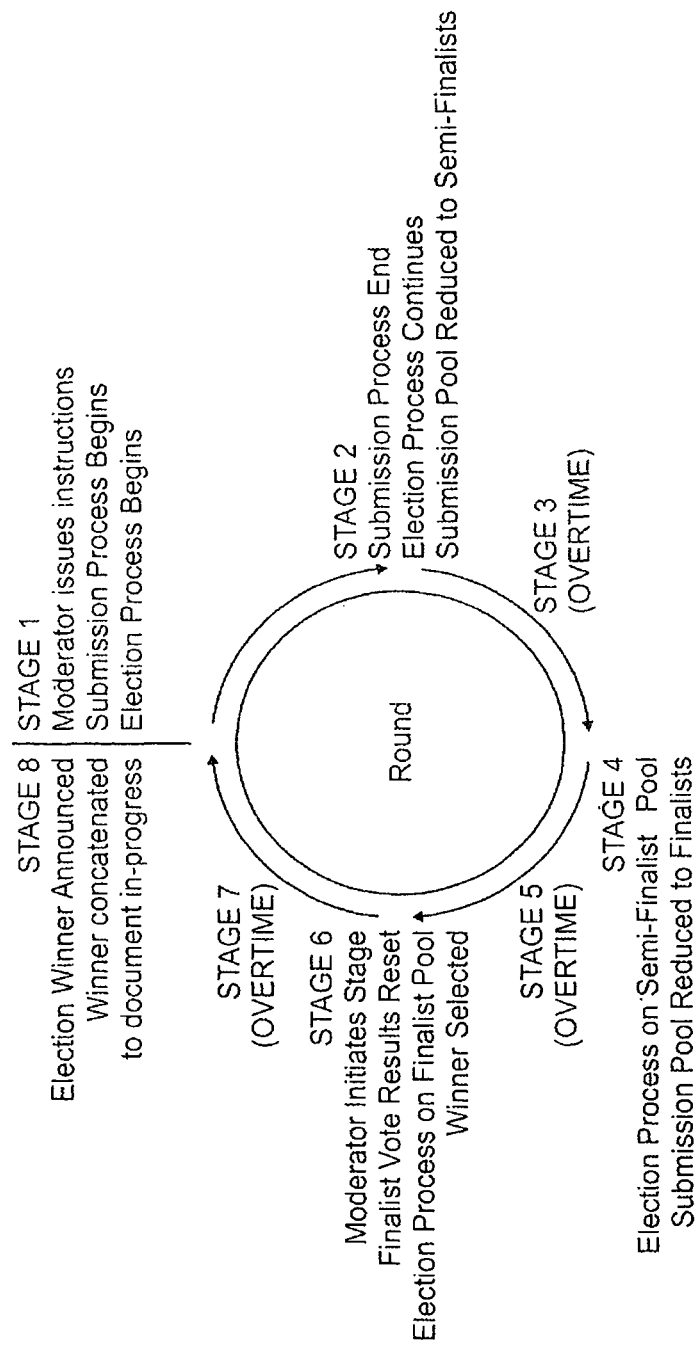
FIGS. 11-12 illustrate diagrammatically a multi-stage voting routine according to the present invention.
Figure 12:
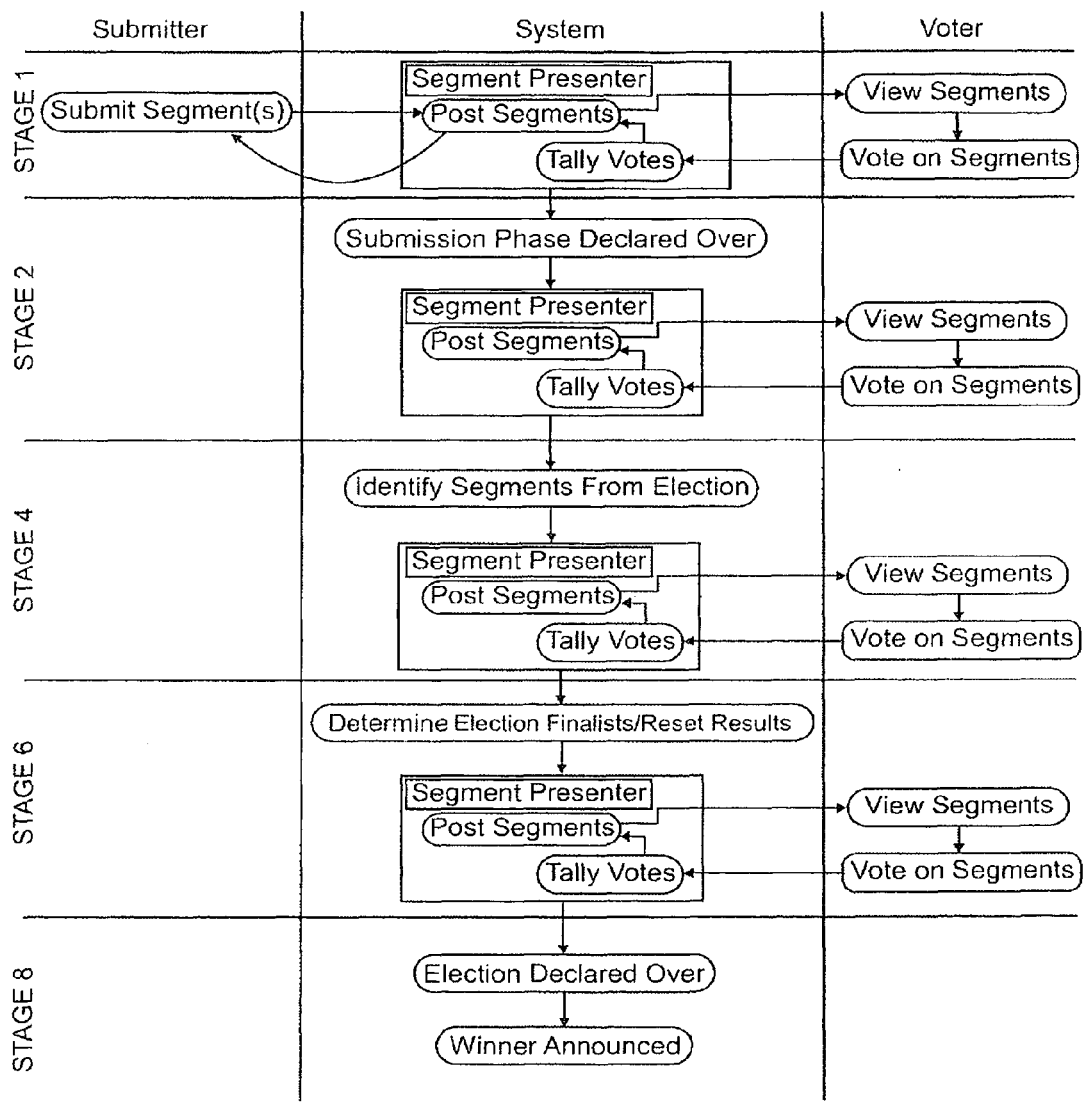

As shown in FIG. 11, during the first stage, submitters 102 may submit segment candidates and, once a minimum number of segments have been submitted an election begins. During the second stage, voters 106 may vote on submitted segment candidates but participants may no longer submit new segments. The goal of the second stage is to reduce the number of segment candidates in the segment pool to a smaller, semifinalist pool (as compared to the finalist pool in the previous embodiment).

A segment is removed from the segment pool if all three of the following happen: (i) the segment has received the "minimum browses required"; (ii) the segment has received the minimum number of ratings required; and (iii) the segment's calculated score falls below the "minimum score". If these three criteria are met, the segment is said to be "Quick Cut" from the segment pool. If a segment is Quick Cut, it will be permanently removed from the segment pool and that segment will not be eligible to move into the next round.

A segment will also be removed from the segment pool if the segment has received the "maximum browses required". If this criterion is met, then the segment is said to be "Upper Cut." If a segment is Upper Cut, then it may be considered for inclusion in the next stage. If a segment has been Upper Cut, it is placed in the "evaluation block" for that stage (see Period One in FIG. 14).

The second stage ends after the first of one of the following events occurs: all preliminary segment candidates have been Quick Cut or Upper Cut; after the administrator-specified duration; or if the administrator ends the stage. A third stage may be employed as an optional overtime stage.

A percentage or finite number of segments will be selected to move on to a fourth stage. The selected segments will be called "semi-finalists" and the collective group will be members of the "semi-finalist pool". During the fourth stage, participants will only vote on the segments selected to be semi-finalists. New submissions are not allowed during the fourth stage. The goal of the fourth stage is to reduce the number of segments in the semi-finalist segment pool to an even smaller number of finalists, usually five. The fourth stage will end after the "Election" has selected the specified number of finalists. These finalists are placed into the "Finalist Pool" and voted on in the next stage.

Similar to the second stage, the fourth stage will end after the first of one of the following events occurs: all semi-finalist segments have been Quick Cut or Upper Cut; after the administrator-specified duration; and if the administrator ends the stage. A fifth stage may be employed as an overtime stage, which is similar to the third stage.

During the sixth stage, participants will only vote on the segments in the "Finalist Pool." Each of these segment's vote results will be reset at the beginning of the sixth stage. The moderator will begin the sixth stage. Similar to other stages, the sixth stage will end after the first of one of the following events occurs: all finalist segments have been Quick Cut or Upper Cut; after the administrator-specified duration; or the administrator ends the stage.

At the end of the sixth stage, the top ranking segment is declared the round winner. If a tie vote exists at the end of the sixth stage, then a seventh stage may be employed as an optional overtime stage. Otherwise, the election is declared "Completed" and an election winner is announced. The election winner will be added to the election's corresponding collaborative work in the appropriate sequence order. New submissions are not allowed in the sixth stage.

Figures 1, 14:
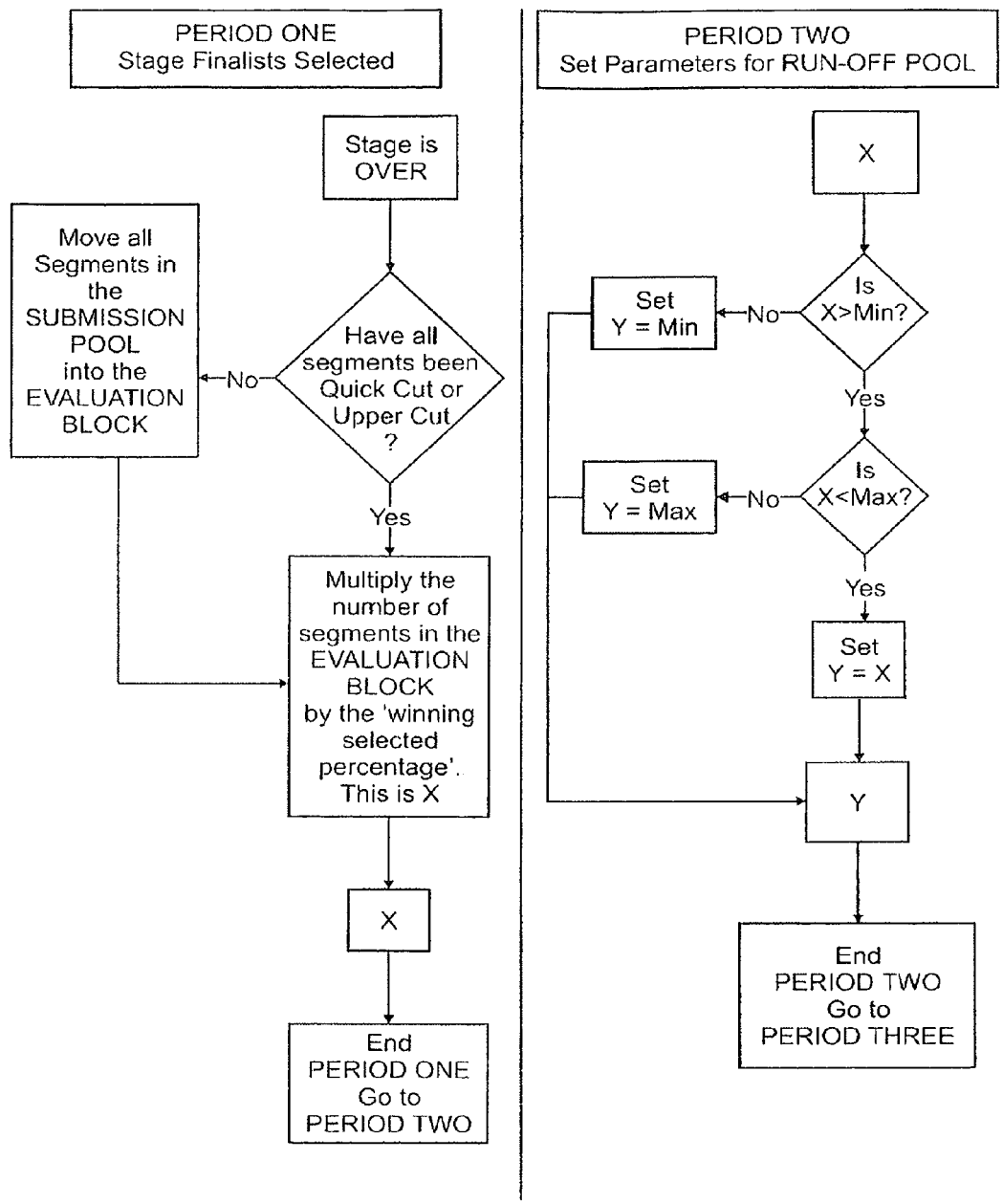
FIG. 14 illustrates, in flow diagram form, multi-stage voting routine according to the present invention.
Figures 2, 14:
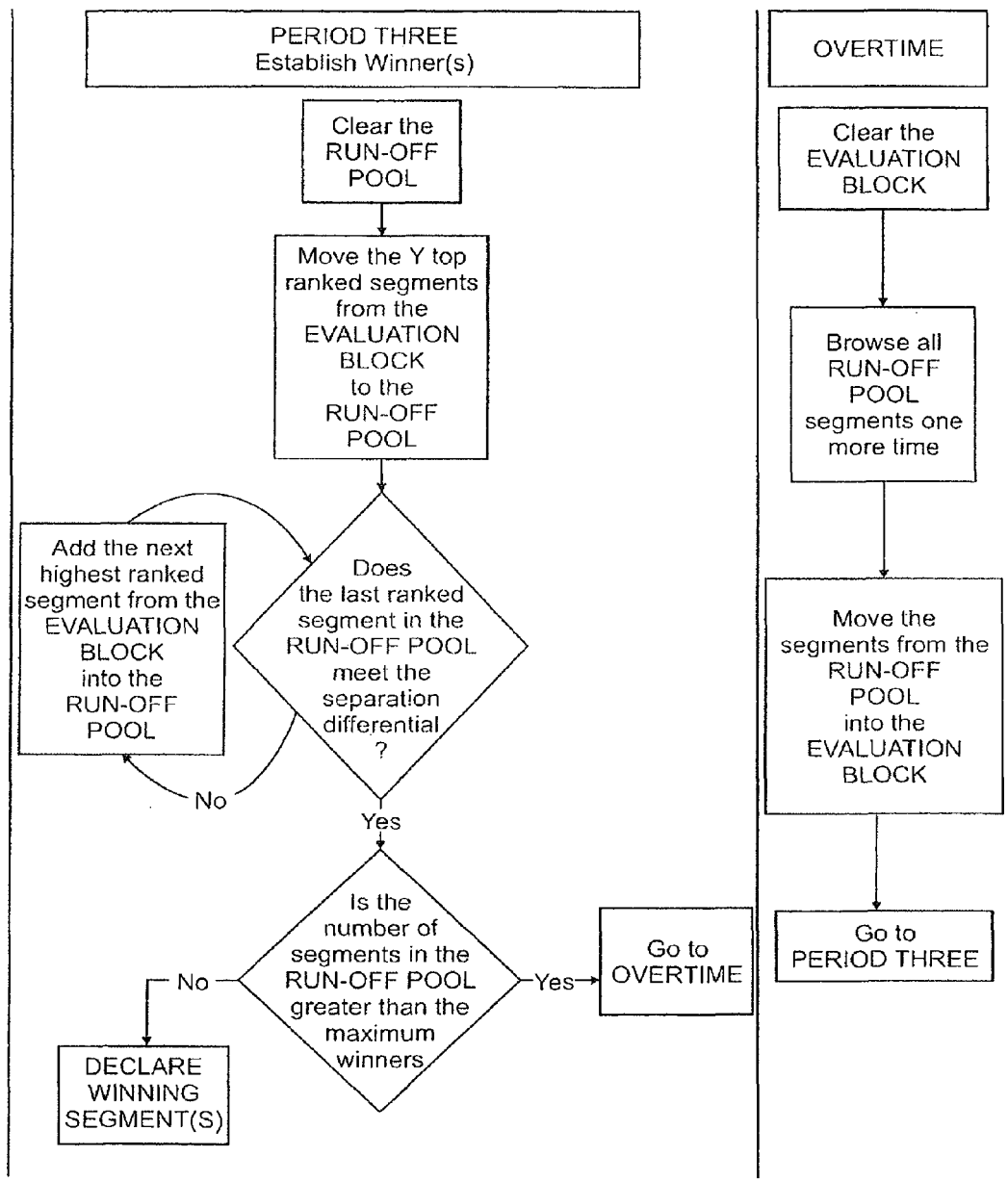

Referring further to FIG. 14, the process for selecting a winning segment is now described in more detail. At the end of each of the second, fourth and sixth stages, a number of the segments in the evaluation block are placed into a "Run-Off Pool" to narrow the number of segment candidates. The number of segments in the Run-Off Pool is called the "Base Number of Winners" (Y). The Base Number of Winners is based on one of the following: a percentage (X) based on the initial number of segments present in the evaluation block; a minimum number if the percentage is too low; or a maximum number if the number of selected winners is too high.

If the Base Number of Winners is less than the minimum number of winners, set the Base Number of Winners equal to the minimum number of winners and take the minimum number of segments. For the rest of this stage, the Base Number of Winners will equal the minimum number of winners, and not the original percentage specified by the administrator.

If the Base Number of Winners is greater than the maximum number of winners, set the Base Number of Winners equal to the maximum number of winners and take the maximum number of segments. For the rest of the election process, the Base Number of Winners will always be equal to the maximum, not the original percentage specified by the administrator.

Once the Base Number of Winners is determined, that number of top ranking segments will be moved from the evaluation block into the Run-Off Pool. If the vote score separation between the last Run-Off Pool segment and the top segment remaining in the evaluation block is within a "Separation Differential" then additional segments will be moved into the Run-Off Pool until the Separation Differential requirement is met.

The Separation Differential ensures that all segments that barely miss being accepted in the Run-Off Pool are also considered for possible inclusion in the next round. Indeed, according to a preferred embodiment of the present invention, all segments in the evaluation block that fall within the separation differential of the lowest ranking segment in the Run-Off Pool will be included in the Run-Off Pool.

For example, assume that the winning percentage is 15%, the minimum number of segments selected is 10, the maximum number of segments selected is 20 and the winning separation differential is 0.5. At the end of the stage, 100 segments have been uppercut into the evaluation block. Multiply 100 segments by the winning percentage of 15% to derive the Base Number of Winners.

In this example, 15% would result in a Base Number of Winners of 15. Since 15 is between the minimum 10 and the maximum 20, 15 will become the Base Number of Winners (Y) and will remain the Base Number of Winners for the rest of the stage. The top 15 segments will be moved from the evaluation block into the Run-Off Pool.

However, if we look at the segment that came in $15^{th}$ place and the segment that came in $16^{th}$ place, we see that their respective scores are separated by only 0.1 points. This is under the separation differential, so we include the $16^{th}$ place segment into the run-off group. Then we compare the $16^{th}$ place segment score to the $17^{th}$ place segment score. If the difference between these two scores is less than the separation differential, then we include the $17^{th}$ place segment into the run-off group. This continues until the difference between two adjacent scores is greater than the separation differential.

If, at the end of this process, the total number of segments in the Run-Off Pool is not greater than the maximum number of winners, then all segments in the run-off group are declared winners.

If the total number of segments in the Run-Off Pool is greater than the maximum number of winners, then overtime begins. As explained this may happen after the second stage, the optional third stage, or after the fourth stage, the optional fifth stage, or after the sixth stage, the optional seventh stage.

Referring to FIG. 14, an overtime period begins if the number of segments in the Run-Off Pool exceeds the allowable maximum number of winners for a stage. As explained the third, fifth and seventh stages may be used as overtime stages. In an overtime stage, each segment in the Run-Off Pool will be presented to a voter one additional time.

First, the original evaluation block is cleared. Then, after each segment has been browsed once, all the segments from this Run-Off Pool will be placed back into the evaluation block. The Run-Off Pool is cleared and the process repeats with the top 15 (Y) segments being moved from the evaluation block into the Run-Off Pool where the Separation Differential rule is applied again. If the new Run-Off Pool has fewer than the "maximum number of winners", then the stage ends and the winner(s) declared.

If the new Run-Off Pool has greater than the "maximum number of winners", then the overtime period continues, with each segment in the Run-Off Pool needing to receive one additional browse. This process continues until the final Run-Off Pool has less than or equal to the maximum number of winners or the administrator ends the stage.

Like the two-stage voting process, the host will determine that the voting process is complete when certain criteria established by the voting system are satisfied. With a winning segment selected, the host records it as elected in the segments database and, appending it to the end of the document in progress, records it to the winners database, thus "growing" the document by one segment. Round one is now complete. With a segment of the document determined, the host will now make available the option to view the document in progress, as shown in FIG. 5.

Round two will begin when the moderator inputs and submits the parameters for the next segment. The cycle of submitting and voting now begins again as registered participants log into the system to discover that a new round has begun. The rounds continue until the moderator tells the host that the document is complete, at which point, the only option for participants is to view the document in progress.

Accordingly, a method and system is provided for an unlimited number of participants connected through computers over a digital network to collaboratively build a document, incorporating any known media formats, by selecting one segment at a time through a repeating cycle employing a voting process.

In a series of rounds, a document moderator publishes over the network a set of parameters for an upcoming segment of the document being created. Based on those parameters, individual participants create and submit document segments over the network. The segments, which may consist of a single or any combination of media formats, are stored in a database and recalled in a fashion which enables an unlimited number of networked participants to vote for the best one. When the voting concludes and the votes electronically tabulated, the winning segment is appended to the end of the organically growing document and published over the network. The rounds of submitting and voting continue until the document is completed.

In so far as embodiments of the invention described herein may be implemented, at least in part, using software controlled programmable processing devices, such as a computer system, it will be appreciated that one or more computer programs for configuring such programmable devices or system of devices to implement the foregoing described methods are to be considered an aspect of the present invention. The computer programs may be embodied as source code and undergo compilation for implementation on processing devices or a system of devices, or may be embodied as object code, for example. Those of ordinary skill will readily understand that the term computer in its most general sense encompasses programmable devices such as those referred to above, and data processing apparatus, computer systems and the like.

Preferably, the computer programs are stored on carrier media in machine or device readable form, for example in solid-state memory or magnetic memory such as disk or tape, and processing devices utilize the programs or parts thereof to configure themselves for operation. The computer programs may be supplied from remote sources embodied in communications media, such as electronic signals, radio frequency carrier waves, optical carrier waves and the like. Such carrier media are also contemplated as aspects of the present invention.

It will thus be seen that the aspects set forth above, among those made apparent from the preceding description, are efficiently attained and, since certain changes may be made in carrying out the above method and in the system set forth without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A computer-assisted method for having a plurality of participants authoring and submitting segment candidates to create a collaborative work over a computer network, the computer-assisted method comprising:
    receiving, over the computer network, segment candidates submitted by one or more of the plurality of participants;
    distributing at least a subset of the submitted segment candidates to a voting audience over the computer network;
    receiving votes from the voting audience for a winning segment candidate; and
    selecting said winning segment candidate from the submitted segment candidates for inclusion in the collaborative work based on the votes from the voting audience for creating the collaborative work;
    wherein the voting audience includes members of a general public in addition to those in the plurality of participants.

2. The method according to claim 1, wherein receiving the votes is open to votes from the general public.

3. The method according to claim 1 further comprising:
    storing the submitted segment candidates; and
    identifying data on the plurality of participants in a database for at least one of retrieval, editing, and display;
    wherein identifying data for each participant that submitted a segment candidate is stored in association with the corresponding submitted segment candidate.

4. The method according to claim 1 further comprising:
    providing segment instructions to the plurality of participants for authoring the segment candidates.

5. The method according to claim 4, wherein the segment instructions for the collaborative document are provided to the plurality of participants during intervals, wherein each interval has associated therewith a segment instruction and segment candidates are submitted based on the segment instructions and the collaborative document is sequentially created based on the segment instructions and the winning segment for each interval.

6. The method according to claim 1, wherein the segment instructions for the collaborative work are provided to the plurality participants at the same time.

7. The method according to claim 1, wherein votes are received from the audience in a round, wherein a round comprises a time period for receiving segment candidates and a tune period for voting on the submitted segment candidates.

8. The method according to claim 7, wherein segment candidates continue to be received during the voting time period.

9. The method according to claim 7, wherein as new segment candidates are being received, previously submitted segment candidates are being eliminated based on a running tabulation of votes received.

10. The method according to claim 1, wherein votes are received in multiple voting stages and wherein each voting stage is used to select fewer submitted segment candidates for subsequent voting stages until a winning segment candidate is selected.

11. A host server coupled to a computer network for supporting a plurality of participants authoring and submitting segment candidates to create a collaborative work over the computer network to the host server, the host server configured to:
    receive, over the computer network, segment candidates submitted by one or more of the plurality of participants;
    distribute at least a subset of the submitted segment candidates to a voting audience over the computer network;
    receive votes from the voting audience for a winning segment candidate; and
    select said winning segment candidate from the submitted segment candidates for inclusion in the collaborative work based on the votes from the voting audience for creating the collaborative work;
    wherein the voting audience includes members of a general public in addition to those in the plurality of participants.

12. The host server according to claim 11, wherein receiving the votes is open to votes from the general public.

13. The host server according to claim 11 further being configured to:
    store the submitted segment candidates; and
    identify data on the plurality of participants in a database for at least one of retrieval, editing, and display;
    wherein identifying data for each participant that submitted a segment candidate is stored in association with the corresponding submitted segment candidate.

14. The host server according to claim 11 further being configured to:
    provide segment instructions to the plurality of participants for authoring the segment candidates.

15. The host server according to claim 14, wherein the segment instructions for the collaborative document are provided to the plurality of participants during intervals, wherein each interval has associated therewith a segment instruction and segment candidates are submitted based on the segment instructions and the collaborative document is sequentially created based on the segment instructions and the winning segment for each interval.

16. The host server according to claim 11, wherein the segment instructions for the collaborative work are provided to the plurality participants at the same time.

17. The host server according to claim 11, wherein votes are received from the audience in a round, wherein a round comprises a time period for receiving segment candidates and a time period for voting on the submitted segment candidates.

18. The host server according to claim 17, wherein segment candidates continue to be received during the voting time period.

19. The host server according to claim 17, wherein as new segment candidates are being received, previously submitted segment candidates are being eliminated based on a running tabulation of votes received.

20. The host server according to claim 11, wherein votes are received in multiple voting stages and wherein each voting stage is used to select fewer submitted segment candidates for subsequent voting stages until a winning segment candidate is selected.

* * * * *